UNITED STATES PATENT OFFICE.

KARL STEPHAN, OF BERLIN, GERMANY, ASSIGNOR TO CHEMISCHE FABRIK AUF ACTIEN, VORM. E. SCHERING, OF BERLIN, GERMANY.

PROCESS OF MAKING CAMPHENE.

SPECIFICATION forming part of Letters Patent No. 707,271, dated August 19, 1902.

Application filed January 18, 1902. Serial No. 90,359. (No specimens.)

*To all whom it may concern:*

Be it known that I, KARL STEPHAN, chemist, doctor of philosophy, a subject of the Emperor of Germany, residing at Berlin, Kingdom of Prussia, German Empire, have invented a new and useful Improvement in Processes of Manufacturing Camphene, of which the following is a specification.

Contrary to the indications in literature (see the *Berichte der Deutschen Chem. Gesellschaft* Vol. XXV, page 146) wherein an alcoholic solution of ammonia is stated to be useless for the production of camphene I have discovered that good yields of camphene free from chlorin are obtained when an alcoholic solution of ammonia is caused to react upon pinene hydrochlorid, iodid, or bromid for a long time at a high temperature. Like results are obtained by the use of aqueous or gaseous ammonia. Probably the failure recorded above was due to the insufficiently long action of the alcoholic solution of ammonia.

In order to manufacture camphene free from chlorin, one proceeds as follows:

Example I. Ten kilograms of pinene hydrochlorid are heated in an autoclave with somewhat more than the theoretical quantity of an alcoholic solution of ammonia for twenty hours to from 210° to 220° Celsius. After cooling it is rectified with steam. The camphene obtained is entirely free from chlorin. It solidifies in the cold. By fractionating under usual pressure a small quantity, about five per cent., is obtained boiling above 160° which consists of isobornyl ethyl ether.

Example II. Ten kilograms of pinene hydrochlorid are heated with eight kilograms of aqueous ammonia (having a specific gravity of 0.910 at 15° Celsius) for twenty hours to from 210° to 220° Celsius. The camphene so obtained is free from chlorin, and the yield is about ninety per cent. of the theoretical.

Example III. An autoclave is charged with ten kilograms of pinene hydrochlorid, to which, preferably, an inert substance is added, dry ammonia-gas is passed in, and the mixture heated for from three to four hours at about 210° Celsius. After cooling ammonia-gas is again led in in order to replace the ammonia used up in the reaction and the mixture again heated for from three to four hours and the whole operation repeated once or twice, if necessary. After cooling the product of the reaction is purified, as in Examples I and II. A splendid yield is obtained, the product being entirely free from chlorin. Like results are obtained by the use of the equivalent quantities of pinene hydrobromid and pinene hydroiodid; but of course the pinene hydrochlorid is preferably used on account of its cheapness.

Example IV. Heat four hundred grams of pinene hydrobromid with three hundred and fifty cubic centimeters of a ten-per-cent. alcoholic solution of ammonia for eighteen hours at 210° and then proceed as in Example I. The process is carried out in exactly the same manner when pinene hydroiodid is used. (See *Berichte der Deutschen Chem. Gesellschaft* Vol. XXXII, page 2310.)

In order to define the term "camphene," it may be remarked that under this term it is intended to include hydrocarbons which are formed by splitting off water from borneol or isoborneol and which can be transformed back into borneol or isomeric borneols by hydration.

I claim as my invention—

Process of manufacturing camphene, which consists in causing ammonia to react upon hydrogen-haloid compounds of pinene for a long time at a high temperature and isolating in the usual manner the camphene thus produced, substantially as set forth.

In testimony whereof I have signed my name to this specification in the presence of two subscribing witnesses.

KARL STEPHAN.

Witnesses:
 HENRY HASPER,
 WOLDEMAR HAUPT.